March 22, 1966  K. E. HUMBERT, JR  3,241,680
FILTER
Filed Sept. 12, 1962
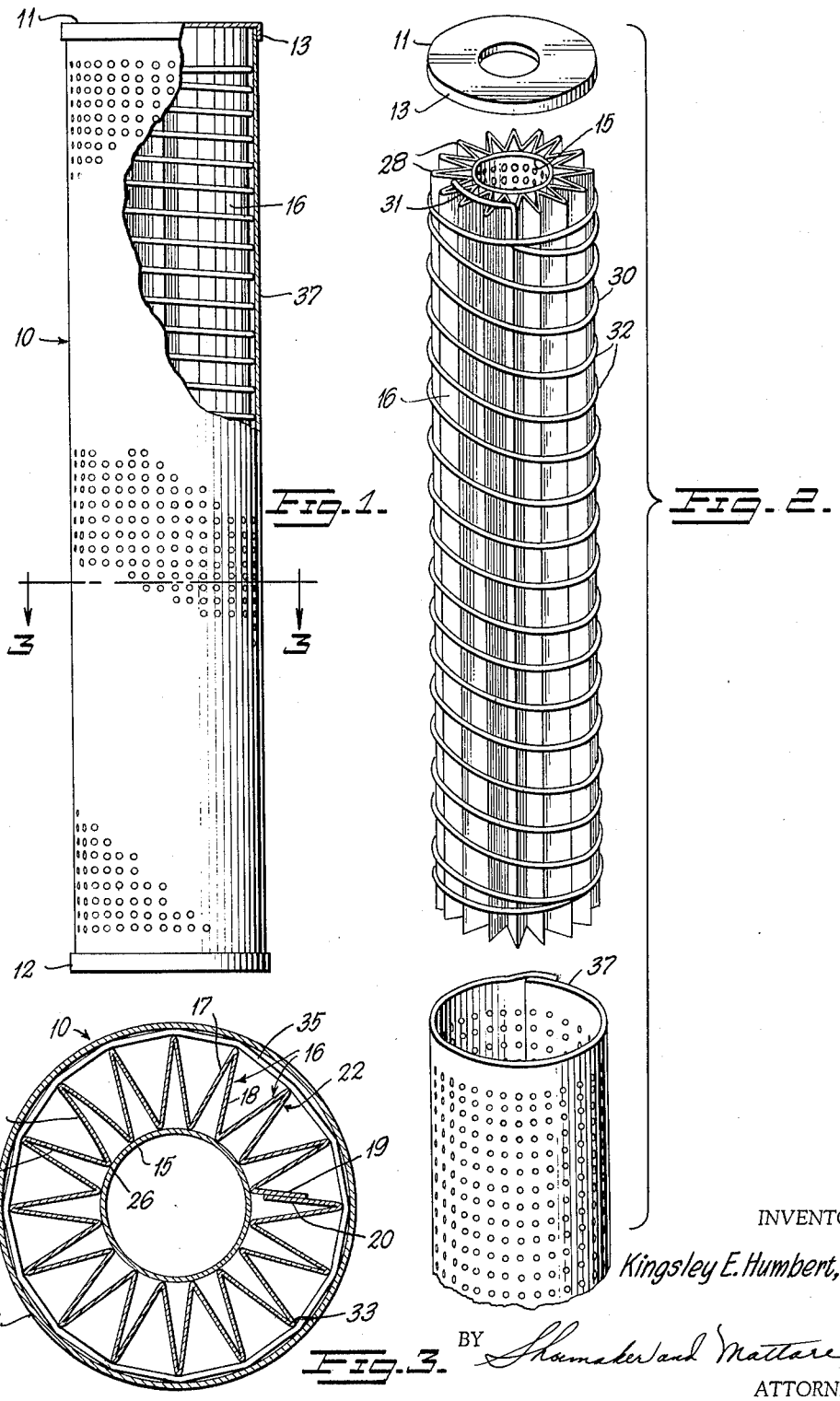
INVENTOR
Kingsley E. Humbert, Jr.
BY Shoemaker and Mattare
ATTORNEYS 3,241,680
FILTER
Kingsley E. Humbert, Jr., Gastonia, N.C., assignor to Wix Corporation, Gastonia, N.C., a corporation of North Carolina
Filed Sept. 12, 1962, Ser. No. 223,139
2 Claims. (Cl. 210—457)

The present invention relates to a filter and more particularly to a filter having a plurality of convolutions or pleats.

It is an object of the present invention to provide a surface-type filter element made of compounded paper and the like.

In such a filter element, the paper is generally arranged in an annulus and is provided with a perforated center member. The paper is generally formed into a plurality of longitudinal pleats or convolutions so that if one is looking at a cross-section of the filter element, it is generally of a star-shaped configuration. The pleats of paper are generally impregnated with a phenolic resin and the paper is generally pleated by well-known pleating machines.

The free ends of the paper are fastened together so that the star-shaped element is of one continuous or single piece of paper. The free ends of the element may be fastened together by cementing, by stitching, or by clamping them together by staple means and the like. The opposite edges or end of the pleats are generally sealed by metal or paper end caps with turned down rims and the end caps are bonded to the edges of the pleats by an adhesive cement. The filtration is generally in an outside-in direction so as to permit the filter element to retain a larger amount of dirt and other contaminants being filtered from a liquid before undue restriction to flow through the element occurs and the filter element requires replacement by a fresh element.

One of the difficulties encountered in the use of such a filter element is that the longitudinal pleats do not always stay properly spaced apart from one another but have a tendency to pinch together or come in contact with each other. That is, since the midportion of the longitudinally extending pleats are not secured to anything, they have a tendency to squeeze together and contact one another, thus blocking off and reducing the surface area of the pleats available for filtration. This is due to the fact that only the end edges of the pleats which are bonded to the end caps are properly secured, whereas the portion of the pleats between the end caps or the portion of the pleats fartherest away from the end caps have a tendency to be pushed together by the pressure of the liquid that flows through the pleats.

Various means have been conceived to properly space the radially disposed pleats apart from one another to utilize the full surface area of the filter element for filtration. One such means, for example, that has been brought forth is to provide a perforated body wrapper around the outside of the pleats and to bond the outer edges or peaks to the body wrapper. The shortcoming of this solution to the problem is the fact that the commercial pleating machines do not always provide pleats of the same length. Thus, some of the pleats will be shorter or longer than the other pleats so that when the pleated filter element is disposed in an annulus configuration, not all of the pleats will contact the body wrapper and hence will not be properly secured thereto. It is also a problem to provide adhesive material on the inside of the body wrapper and thereafter to insert the paper annulus into the body wrapper in an efficient manner without the adhesive being wiped off of the body wrapper in the wrong places or without the adhesive actually getting onto undesirable portions of the surface area of the pleats and thereby reducing the area of the filter element available for filtration.

It is an object of the present invention to provide a filter element having a plurality of longitudinally extending or axial pleats radially disposed in annulus configuration in which the outer edges or side edges of the pleats are properly secured in a predetermined spaced apart relationship so as to utilize the full surface area of the filter element for filtration purposes.

It is another object of the present invention to provide means for properly securing the axial pleats of an annulus of filter paper so that they are properly spaced apart from one another to prevent pinching together of two adjacent pleats.

It is another object of the present invention to provide an elongated filter element in which the opposite ends of the pleats are bonded to end caps and in which other means are provided for properly spacing apart laterally the portion of the pleats between the end caps.

It is another object of the present invention to provide spirally wound means which contact each and every pleat of an annular filter element so as to properly secure them in spaced apart relationship with one another for the serviceable life of the filter element.

It is another object of the present invention to provide simple and inexpensive retaining means for properly securing the pleats of an annular filter element in spaced apart relationship which means will contact and secure each and every pleat of the annulus and which means will further be properly secured to the body wrapper of the filter element.

It is another object of the present invention to provide means for securing the pleats of an annular filter element in a predetermined position spaced apart from each other and which will secure all of the pleats even though the pleats may be of different depth or length.

It is another object of the present invention to provide flexible string means coated with an adhesive material wrapped around the pleats of an annular filter element with the string means in a stretched condition around the pleats so as to contact each and every pleat and properly space them apart even though the pleats are of different depth and do not originally extend the same radial distance outwardly from the center tube around which they are disposed.

In accordance with the present invention, an annular pleated paper filter element is provided with a perforated center tube disposed on the inside of the pleats and a perforated body wrapper disposed around the outside of the pleats with end caps sealing off the opposed ends of the pleats, with flexible retainer means wrapped around the outer side walls or edges of the pleats with adhesive material applied to the retainer means and the flexible retainer means being disposed around the pleats in a taut manner or slightly under tension so that the outer peaks of each and every pleat are engaged by the retainer means and in contact therewith so that when the adhesive dries, it maintains the pleats in spaced apart relationship. The flexible retainer means further are disposed around the outside of the pleats so that it adheres to the inner surface of the body wrapper and thereby secures itself thereto.

Various other objects and advantages of the present invention will be readily apparent from the following detailed description when considered in connection with the accompanying drawing forming a part thereof and in which:

FIG. 1 is a side elevation of the filter element embodying the present invention with parts broken away for purposes of illustration.

FIG. 2 is an exploded perspective view of the component parts of the present invention, and, FIG. 3 is an enlarged transverse sectional view of the filter element embodying the present invention taken along lines 3—3 of FIG. 1.

Referring to the drawings, the reference numeral 10 generally designates a filter element or cartridge 10 having end caps or discs 11 and 12 provided with turned-in rims 13. The filter element is provided with a perforated center member or tube 15.

The filter element is made by first forming a sheet of resin impregnated paper into a number of pleats or convolutions. The paper is pleated on a conventional pleating machine which does not form part of the invention, to provide V-shaped pleats 16 formed of two sections or segments 17, 18.

After a predetermined number of pleats are formed in a single sheet of paper, the paper is cut by well-known means not forming part of the invention. Thereafter, the free ends of the pleats 19 and 20, as best shown in FIG. 3, are overlapped and cemented together. Thereafter, the pleats are disposed over or around the perforated center tube 15 as shown in FIG. 3, to form an annulus 22 of pleated paper. It will be noted in FIG. 3 that the radial depth of the pleats is not always of equal length. For example, as indicated at 24, this wall of a pleat 16 is slightly bowed, whereas the adjacent wall 25 of the next adjacent pleat is not bowed so that it is readily apparent that the depth of these pleats are unequal. The inner ends or peaks 26 of the pleats are positioned around the center tube 15 so as to be in contact with the outer surface of the perforated center tube 15. The upper edges 28 (see FIG. 2) of the pleats are sealed off by the end cap 11, while the lower edges of the pleats are sealed off by the end cap 12.

After the annulus is disposed around the center tube 15, a piece of string or twine 30, such as ordinary package wrapping string, is dipped into a liquid glue cement or any other well-known adhesive material so as to be completely covered thereby. Thereafter, one end 31 of the string is laid across or on top of the upper edges 28 of the pleats in an overlapping fashion and the string is progressively wrapped in individual ringlets or coils 32 at predetermined intervals and in a spiral arrangement, around the outer peaks 33 of the pleats. The coils of string 30 are wrapped around the pleats of the annular filter element from the edge 31 to the lower edge of the pleats and the bottom end of the string is laid across or against the lower edges of the pleats in the same manner as the upper edges of the pleats. During the wrapping of the string around the filter annulus, the string is slightly stretched or kept taut so that the string will contact the outer peak of each and every individual pleat so that the portion of the flexible string designated 35 extending between two adjacent pleats 16 will be substantially straight and properly secure the pleats in a predetermined spaced spart relationship with each other, as shown in FIG. 3.

Thereafter, the perforated body wrapper 37 is disposed around the pleats and the string. The body wrapper is preferably slipped over or mounted on the pleats so that the adhesive material on the strings will contact and secure the inner surface of the body wrapper to the string, as best seen in FIG. 3. Each coil 32 of the string will have some portion thereof bonded to the inner surface of the body wrapper. When the body wrapper has been properly positioned on the annulus, the upper end cap 28 has an adhesive material or cement such as phenolic resin disposed on the inner surface thereof and is thereafter positioned over the upper edges of the pleats 28 to properly seal them with the turned-in rim 13 which also has adhesive cement applied thereto, disposed around the outer surface of the body wrapper and in contact therewith to bond it to the wrapper. The lower end cap is secured to the lower edges of the pleat and to the body wrapper in the same manner.

Thus, with the present invention, it is apparent that the applicant has provided novel means for properly securing the longitudinally extending radially disposed individual pleats of an annulus of filter paper in predetermined spaced apart relationship. This is accomplished by wrapping the pleats with a flexible strand material, such as a string or the like, around the circumeference of the pleated annulus from one end to the opposite end thereof, which string is covered with an adhesive material. Thus, the flexible string, when wrapped around the pleats, will bend or bow the pleats of a longer or a greater depth so that all of the outer peak of each individual pleat will come into contact with the string and the adhesive thereon to properly bond to the pleats. Thus, the present invention has provided a means for properly securing the free portion of the pleats between the end caps in a predetermined lateral position so that they cannot pinch together and block off when the liquid under pressure is flowed through the filter cartridge.

In addition, the present invention also provides a flexible string means that not only is secured to each individual pleat but at the same time has its individual coils secured to the inner surface of the body wrapper so as to provide a rigid or integral structure when the adhesive or adhesive material is cured or dried.

It is also obvious that the present invention provides a simple and inexpensive means for accomplishing these results by unskilled labor in an inexpensive manner and in which elongated annular filter elements such as those in the range of 24" to 36" in length can have their pleats properly secured so as to utilize the full surface area for filtration purposes.

Inasmuch as various changes may be made in the form, location and relative arrangement of the several parts without departing from the essential characteristics of the invention, it will be understood that the invention is not to be limited except by the scope of the appended claims.

I claim:

1. A filter element comprising a perforated center tube, an annulus of longitudinal pleated paper surrounding said tube with the inner peaks of the pleats in contact with said tube, a string wrapped around the annulus across the outer peaks of said pleats and in contact therewith, adhesive means securing said string to the individual pleats, a body wrapped around said annulus and the said string and in contact with said string, with said adhesive means securing said wrapper to said string, and end caps sealing off the opposite end edges of said pleats, the said string being in a single continuous piece spirally wrapped around said annulus and having its ends secured between said end caps and the opposing end edges of said pleats.

2. The filter element of claim 1 wherein said string has one end lying across one end edge of said pleats, and is spirally wrapped around said annulus in a substantially stretched condition, and has its opposite end overlapping the other end edge of said pleats, and said end caps being secured to said string ends.

References Cited by the Examiner

UNITED STATES PATENTS

| | | | |
|---|---|---|---|
| 1,662,726 | 3/1928 | Vernay | 210—411 X |
| 2,274,113 | 2/1942 | White | 210—458 |
| 2,314,640 | 3/1943 | Winslow | 210—457 |
| 2,759,610 | 8/1956 | James | 210—493 |
| 2,919,807 | 1/1960 | Briggs | 210—493 X |
| 2,946,450 | 7/1960 | Shaw | 210—457 X |
| 2,988,227 | 6/1961 | Harms | 210—493 |

FOREIGN PATENTS 566,327  11/1958  Canada.

REUBEN FRIEDMAN, *Primary Examiner.*

HERBERT L. MARTIN, *Examiner.*

F. MEDLEY, *Assistant Examiner.*